April 30, 1957   J. WRIGHT ET AL   2,790,516
VEHICLE DISC BRAKE ASSEMBLY
Filed Jan. 22, 1951   4 Sheets-Sheet 4
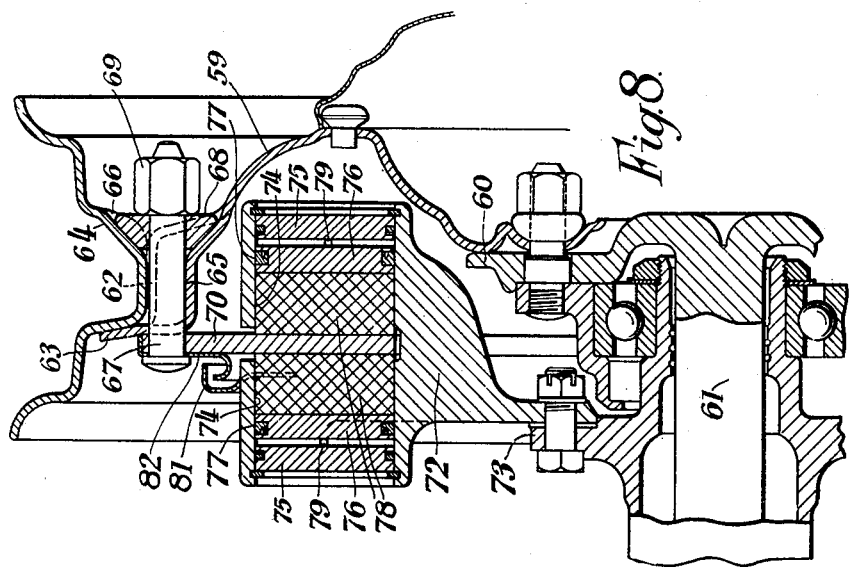
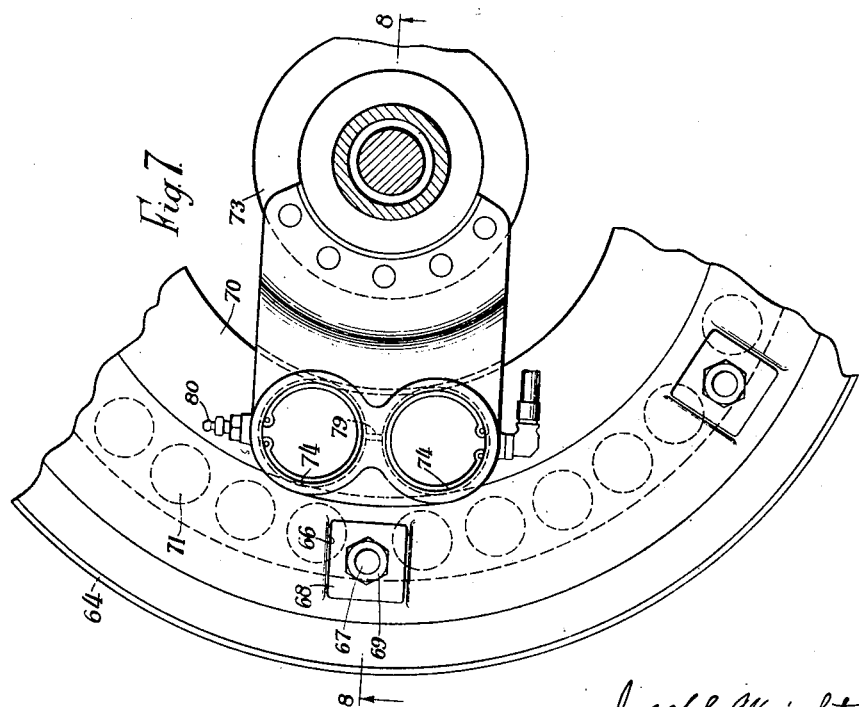
Joseph Wright
Henry James Butler
inventors,
by Benj. T. Rauber
their attorney

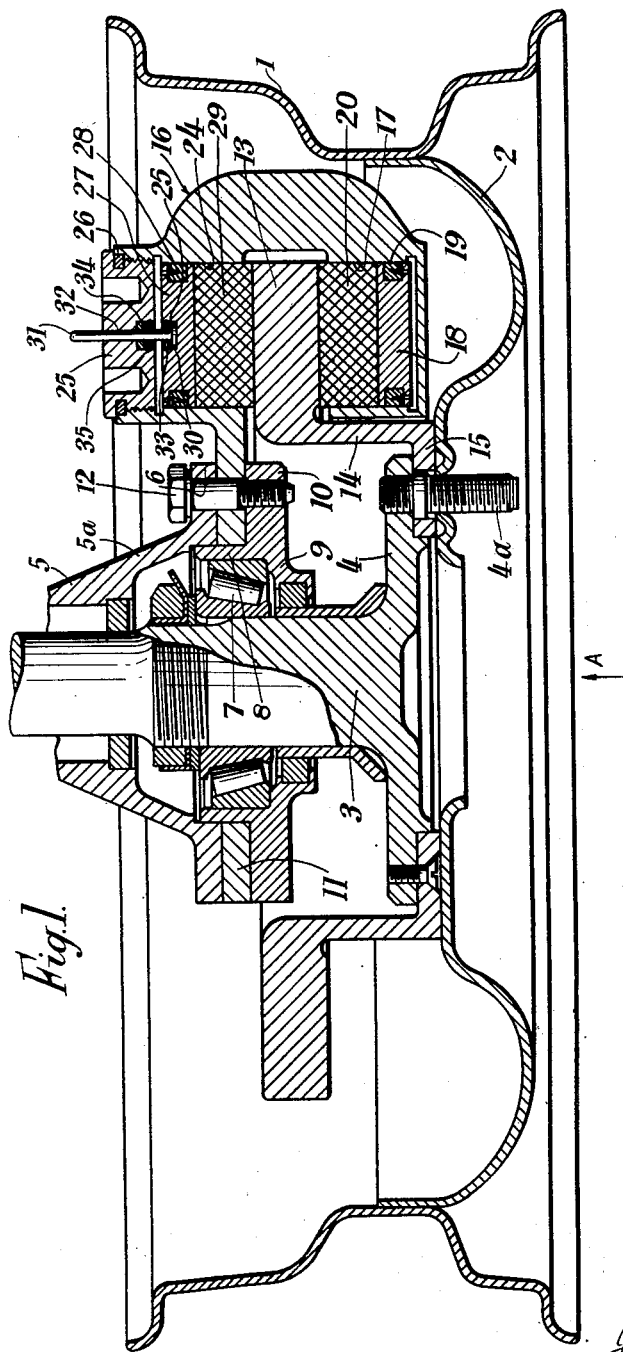

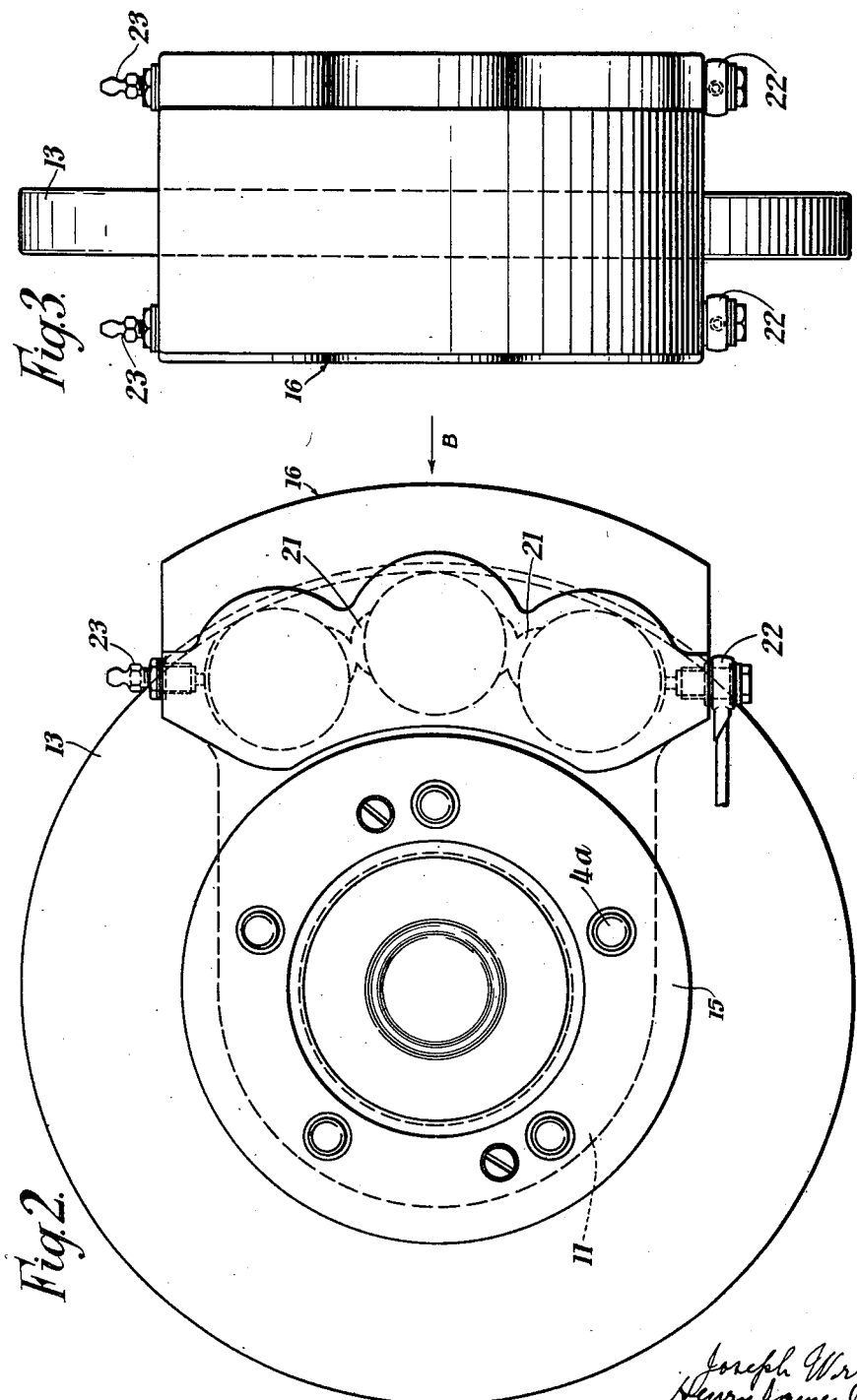

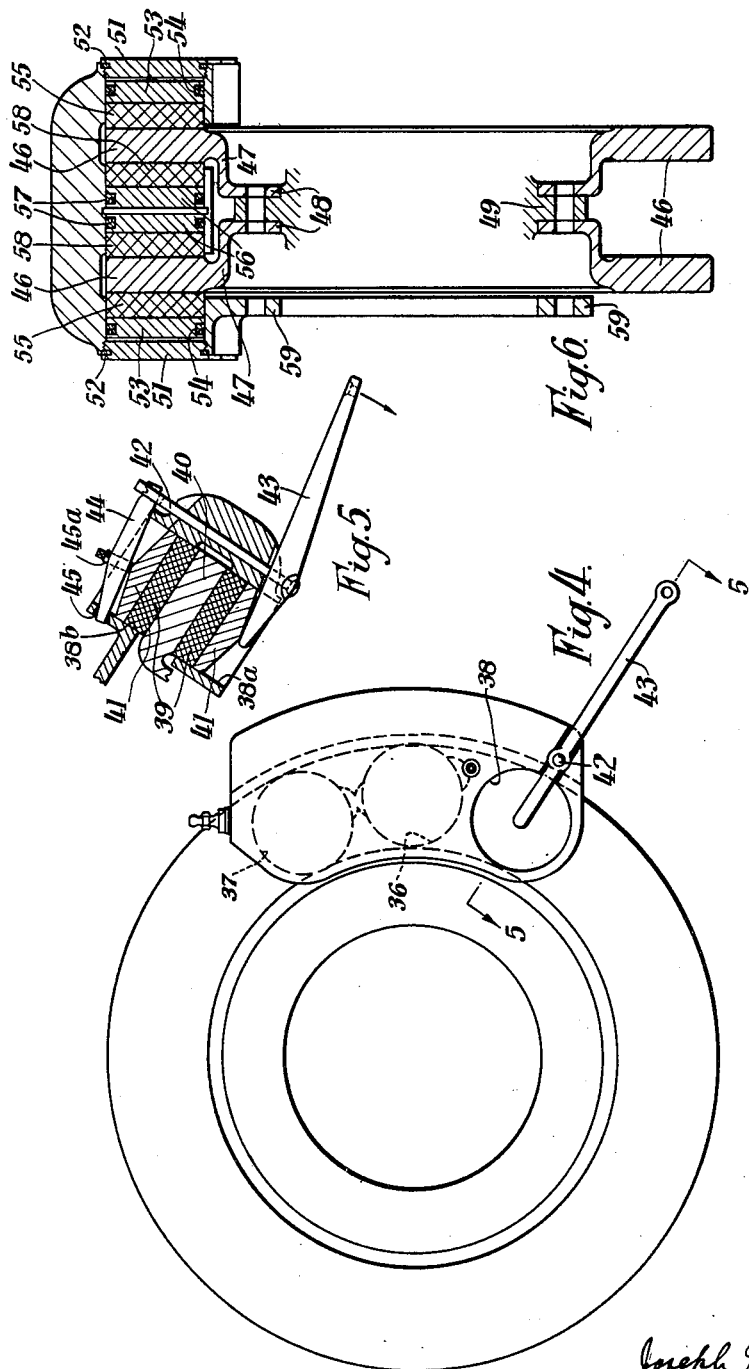

United States Patent Office 2,790,516
Patented Apr. 30, 1957

2,790,516
VEHICLE DISC BRAKE ASSEMBLY

Joseph Wright, Solihull, and Henry James Butler, Sutton Coldfield, England, assignors to Dunlop Rubber Company Limited, London County, England, a British company Application January 22, 1951, Serial No. 207,148

12 Claims. (Cl. 188—73)

This invention relates to disc brakes and wheel and disc brake assemblies for motor vehicles.

Motor vehicles are normally provided with drum brakes comprising a drum rotatable with a wheel, a non-rotatable braking mechanism having two arcuate friction pads to frictionally engage the inner periphery of the drum and one or a pair of hydraulic cylinders to effect said engagement. On braking the vehicle the kinetic energy is converted to heat and the temperature of the inner periphery of the drum is raised. The drum is totally enclosed and thus the heat generated cannot be directly dissipated by radiation into the atmosphere but must first be conducted to the outer periphery of the drum. Prolonged use of the brakes builds up a very high temperature at the inner periphery of the drum, and this induces "brake fade" and the consequent falling off in the efficiency of the brakes.

A further disadvantage of the present type of drum brake is that it cannot provide the torque necessary to brake the heavier and faster types of modern motor vehicle.

The object of the present invention is to provide a disc-type brake for motor vehicles. Another object of the invention is to provide a wheel and disc brake assembly for motor vehicles.

According to the invention a disc brake assembly for motor vehicles and the like comprises a disc secured to a wheel and rotatable with said wheel, a non-rotatable housing straddling said disc and covering a minor portion only of the braking surfaces of said disc, axially aligned friction pads slidable in said housing to frictionally engage the disc between them and a mechanism to effect said frictional engagement.

In order that the invention may be more fully described, reference is made to the accompanying drawings, of which:

Figure 1 is a section of a motor vehicle wheel incorporating a disc brake constructed in accordance with one embodiment of the invention.

Figure 2 is a view of the brake assembly, excluding wheel details and looking in the direction of the arrow A of Figure 1.

Figure 3 is a view of Figure 2 looking in the direction of the arrow B of Figure 2.

Figure 4 is a diagrammatic view of a vehicle disc brake in accordance with another embodiment of the invention.

Figure 5 is a scrap section through 5—5 of Figure 4 looking in the direction of the arrows.

Figure 6 is a view of a twin disc brake for a heavy vehicle and constructed in accordance with another embodiment of the invention.

Figure 7 is a part view of a wheel and disc brake assembly in accordance with yet another embodiment of the invention, and Figure 8 is a section through 8—8 of Figure 7 looking in the direction of the arrows.

In one embodiment of the invention, Figures 1, 2 and 3, a disc brake assembly is provided which can readily be fitted to a conventional motor car wheel and shaft assembly. A well-based rim 1 (Figure 1) is provided with a load-supporting web 2 secured thereto. The wheel hub-member 3 is provided at its outer end with an annular flange 4 and said flange is provided with a plurality of axially extending equispaced annular studs 4a. The non-rotatable axle casing 5 is provided at one end with a flared portion 5a terminating in a radially-extending annular flange 6. A roller bearing 7 is fitted around the hub-member, the outer race thereof bearing against an axially-extending annular flange 8 of an annular bearing member 9. The bearing member is provided with a radially-extending flange 10 axially aligned with flange 6. Located between said flanges 6 and 10 is an annular member 11, solid with a brake housing to be hereinafter described, and said flanges 6 and 10 and member 11 are rigidly secured together by bolts 12.

An annular braking member is provided comprising a disc 13, an axially extending portion 14 and a securing flange 15. The flange 15 is provided with a plurality of equispaced holes corresponding to the studs 4a on the hub-flange 4 and the braking member is fitted on said studs and adjacent said hub-flange. The inner periphery of the load supporting wheel hub 2 is similarly provided with holes, and the wheel is likewise fitted to said studs. A nut (not illustrated) is screw fitted to each stud to hold the assembly rigidly together. Thus the hub and braking member rotate with the wheel. The braking member is fitted with the portion 14 extending axially away from the web of the wheel, and in this position the disc 13 lies substantially in the median plane of the wheel.

The brake housing, solid with the non-rotatable annular member 11, comprises a U-sectioned member 16 of substantially arcuate form straddling the disc and covering a minor portion only of the circumference of said disc. One limb of the member lies adjacent one of the radially extending sides of the disc and the other limb lies adjacent the other radially extending side of the disc. The limbs are joined by a base part lying adjacent the outer periphery of the disc.

Three axially-aligned cylinders are formed in each of said limbs. The cylinders 17 in the limb adjacent the web of the wheel are arranged in side by side relationship, their centres lying on an arc concentric with the disc, and each cylinder is closed at its end remote from the disc. A plunger 18 is slidable in each of said cylinders and a sealing ring 19 is fitted around the outer periphery thereof to prevent the leakage of hydraulic fluid. A cylindrical block of friction material 20 is slidably fitted between each of said plungers and the adjacent face of the disc. The three cylinders are interconnected by the passage-ways 21 (Figure 2) located adjacent their bases. One of the end cylinders is provided with an inlet connection 22 adapted to be connected to a source of hydraulic fluid, whilst the other end cylinder is provided with a bleed vent 23.

The other limb of the housing is similarly provided with three axially-aligned cylinders 24, each of said cylinders being in axial alignment with a corresponding cylinder in the other limb. These cylinders 24 are open at both ends, the ends remote from the discs being threaded. A threaded closure member 25 is secured to the threaded end of each of said cylinders, and a sealing ring 26 is provided to prevent the leakage of hydraulic fluid. A plunger 27 is slidably fitted in each cylinder, said plunger being provided with a sealing ring 28 around the periphery thereof, and a block of friction material 29 is slidably fitted in each cylinder 24 between the plunger 27 and the adjacent face of the disc.

The face of the central plunger 27 remote from the disc is provided centrally with a recess 29a. Seated in said recess is the flanged head 30 of an indicating rod 31 extending axially away from said plunger through a hole 32 in the associated closure member and projecting exteriorly therefrom. The flanged head of the plunger is retained in the recess by a circlip 33. A similar recess 34 is provided in the adjacent face of the closure member and a sealing ring is fitted therein to prevent leakage of hydraulic fluid through the hole 32. A circlip 35 retains the sealing ring in position in the base of its recess.

The cylinders 24 are inter-connected by passageways similar to those shown at 21 (Figure 2). One of the cylinders 24 is similarly provided with an inlet connection 22 adapted to be connected to a source of hydraulic fluid, whilst the other end cylinder is similarly provided with a bleed vent.

The two inlet connections are located at the same end of the housing, one on each side of the disc, and the two bleed vents are located at the other end of the housing. Preferably the housing is assembled to the wheel as shown in Figures 2 and 3 of the accompanying drawings, so that any air bubbles trapped in the system may pass through the cylinders and out of the bleed vent when the system is bled.

On application of hydraulic pressure by the driver of the vehicle the increase in hydraulic pressure in the cylinders forces the plungers inwardly towards the disc, thus forcing the blocks of friction material into frictional contact with both sides of the disc. With the braking pressure removed there is sufficient residual pressure in the system to maintain the blocks in light frictional engagement with the disc. The extent of friction block wear can be easily determined by noting the amount the indicating rod projects outside the closure member. When the end of the indicating rod is, e. g. flush with the closure member, it is an indication that the friction blocks require replacing. It is, of course, assumed that the wear on all the six blocks is substantially equal.

The wheel may be removed, e. g. to repair the tire, in the conventional manner, i. e. by removing the nuts from the studs 4a and sliding the wheel axially off said studs. Axial displacement of the braking member is prevented since the disc is held between the friction blocks.

In another embodiment of the invention a disc-brake for motor vehicles is provided having alternative means for operating the brake. This embodiment, illustrated diagrammatically in Figures 4 and 5, has four cylinders operated by hydraulic pressure and the remaining two cylinders operated mechanically through a cable actuated by a handbrake. In this embodiment, each oppositely disposed pair of cylinders 36 and 37 are operated by hydraulic fluid in the manner hereinbefore described, the cylinders 36 being connected to a source of hydraulic pressure and the cylinders 37 provided with a bleed vent. The oppositely disposed pair of cylinders 38 comprises two open ended cylinders 38a and 38b in each of which is slidably fitted a friction block 39 adapted to frictionally engage the associated radially extending surface of the disc 40. The flat base of a substantially conical pressure member 41 abuts each block.

A hole is provided through the base part of the housing adjacent the cylinder 38, the axis of said hole being parallel to the axis of the wheel. An operating rod 42 is slidably fitted through said hole and projects from each end thereof. A lever member 43 is pivotally secured to one end of said rod, having one end abutting the apex of one pressure member 41 and the other end adapted to be connected, through a flexible cable, with a handbrake. Another lever member 44 at the other side of the housing has one end pivotally secured to the other end of said rod and the other end pivotally located in a slot 45 in the wall of the cylinder 38b. An adjusting screw 45a is fitted through the lever member 42 and has one end abutting the apex of the other pressure member 41.

This construction is so arranged that as the cable is tensioned the lever member 43 is angularly moved to operate the linkage and move both pressure members and friction blocks inwardly to frictionally engage the disc. Wear of the blocks may be compensated by adjustment of the screw 45a.

Figure 6 illustrates diagrammatically a type of disc brake more suitable for very heavy motor cars, commercial vehicles, and the like. In this embodiment of the invention two annular brake discs are provided, each comprising a disc 46, an axially extending portion 47 and a securing flange 48. Said flanges are secured one on each side of a rotatable flange 49 solid with the wheel hub, the portions 47 extending axially away from one another. The U-sectioned housing has one limb extending radially adjacent the outer face of one of the discs 46 and the other limb extending radially adjacent the outer face of the other disc 46. The base part extends axially adjacent the outer periphery of the discs and is provided centrally with another radially extending limb extending between the brake discs 46. These limbs are not specifically illustrated in Figure 6 which is a section taken through the cylinders, hereinafter described.

Each of the limbs is provided with three axially aligned open ended cylinders in side by side relationship, the centres of said cyilnders lying on an arc co-axial with the brake discs. The cylinders in the two outer limbs are provided, on their outer ends, with closure members 51 and sealing rings 52, and each cylinder is likewise provided with a plunger 53 having a sealing ring 54 associated therewith and a block of friction material 55 to frictionally engage the outer sides of the discs 46.

The cylinders in the central limb are each provided with two plungers 56 spaced a short distance apart at the centre thereof, and each cylinder is provided with a sealing ring 57. A block of friction material 58 is slidably fitted in each end of said cylinders between the plungers and the associated face of the adjacent brake disc. Each set of cylinders in the two outer limbs are inter-connected by passageways (not illustrated) and one end cylinder of each set is provided with an inlet connection adapted to be connected to a source of hydraulic pressure whilst the other end cylinder of each set is provided with a bleed vent. Similarly the spaces between the plungers 56 of the cylinders of the central limb are inter-connected, one end cylinder being likewise provided with an inlet connection adapted to be connected to a source of hydraulic pressure and the other end cylinder being provided with a bleed vent.

The housing is non-rotatably secured to the wheel by means of bolts holding the annular flange 59 integral with the housing fast to a flange integral with the axle casing. The housing is preferably so disposed that air trapped in the cylinder may pass from one cylinder to another and pass out of the bleed vent when the system is bled. The web of the wheel is preferably secured to another rotatable flange (not illustrated) solid with the wheel hub.

This brake operates in a similar manner to the embodiment previously described. As the cylinders are pressurized the pads are forced into frictional engagement with the discs and the wheel is braked. One of the cylinders may be provided with a friction block wear indicating device as herein above described.

In yet a further embodiment of the invention, illustrated in Figures 7 and 8, a wheel and disc brake assembly for a motor car comprises an annular load-supporting web 59 bolted at its inner periphery to an annular flange 60 solid with a rotatable part of the wheel axle 61. The annular web is of substantially V-section and is provided at its outer periphery with a flange 62 which extends axially away from the apex of the V, and an annular portion 63 which extends substantially radially outwardly from the end of the flange. A well-base rim 64, adapted to seat a tyre, is provided, the inner periphery of the central channel of said rim being a sliding fit on the axially extending flange of the web, and one side of said channel abutting the substantially radially extending portion of said web.

A plurality of axially-aligned recessed channels 65 of rectangular section are equispaced around the flange of the web and a hole is provided in the outwardly extending portion of the web central of each channel. In the edge of the central channel of the rim remote from the said outwardly extending portion a plurality of rectangular depressions 66 of substantially triangular section in a circumferential direction are formed, each one registering with one of the channels in the flange of the web. A bolt 67 is fitted through each hole, the shank extending axially through the associated channel and projecting into the space between the rim and the web of the wheel. A square washer 68 is fitted on each bolt. Each washer has two opposed tapered sides, one of which abuts the sloping bottom of the depression in the rim, and the other abuts the sloping web, between the walls of the channel. The other two opposed sides of the washer are normal to its face, and abut the edges of the depression and the edges of the channel. The end of the shank of the bolt is threaded, and a nut 69 is secured thereto.

An annular metal brake disc 70, having a plurality of equispaced holes 71 adjacent its outer periphery, is secured to the outwardly extending part of the web by the same bolts 67 that secure the web to the rim. The disc extends radially inwards towards the centre of the wheel. On tightening the nuts the whole assembly is clamped securely together, relative rotation between the rim and the web being prevented by the washers.

A housing 72 is secured to a flange 73 solid with a non-rotatable part of the wheel assembly and extends radially outwards to a location adjacent the rim of the wheel. Said housing is bifurcated with an arm of the bifurcation extending on each side of the brake disc, and adjacent thereto. Each of said arms comprises two hollow cylinders 74 in side by side relationship, their centres lying on an arc of a circle coaxial with the wheel and their longitudinal axes extending axially of the wheel. Each cylinder is provided with a closure member 75 making a fluid-tight joint with that end remote from the brake disc.

Slidably fitting in each cylinder is a plunger 76, and a sealing ring 77 is fitted to the outer periphery of said plunger to prevent the passage of hydraulic fluid between it and the walls of the cylinder. Abutting the plunger is a cylindrical block of friction material 78 which is freely slidable in the cylinder and which is adapted to frictionally engage the braking faces of the disc. The fluid-tight chambers formed in the cylinders in each arm intercommunicate through a conduit 79. Means are provided for connecting one of the chambers in each arm with a source of hydraulic fluid, and a bleed vent 80 is provided leading from the other of said cylinders.

To prevent road dirt and the like from fouling the braking surfaces of the disc on its exposed side, i. e. that side remote from the web, an annular thin metal shield 81 is non-rotatably secured adjacent said disc and extends from a location adjacent the inner periphery of the disc to a location adjacent the outer periphery thereof. A cut-out is provided to accommodate the housing. The outer periphery of the shield is provided with a lip extending axially towards the disc and closely adjacent said lip and parallel therewith is the lip of another annular shield 82 which is rotatably secured to the outer periphery of the disc. Both rotatable and non-rotatable shields serve to prevent the brake disc from being covered with mud and the like.

The brake operates as follows. Increase in pressure in the four fluid-tight chambers moves the plungers away from the closure members, thus forcing the blocks of friction material into frictional contact with the brake disc and hence braking the wheel.

A feature of the invention lies in the ease with which the assembly may be dismantled. By removing the nuts and washers from the bolts the rim and tyre may be slid axially off the flange of the load supporting web and it is then a simple matter to remove the brake from the wheel.

Having described our invention, what we claim is:

1. A disc brake assembly comprising a disc engaging with a rotatable member to be braked and braking means extending circumferentially over only a minor portion of the braking surfaces of the disc and comprising a non-rotatable housing having limbs extending closely adjacent each braking surface of the disc and in fixed axial relation thereto, each such said limb having an opening in each limb forming a guide, a friction member slidable in each guide opening, the end of each guide opening having a clearance from the adjacent braking surface of the disc which remains constant throughout the wear-life of the friction member, and means for forcing each friction member into frictional engagement with the adjacent braking surface of the disc.

2. The disc brake assembly of claim 1 in which said friction member comprises a friction block fitting, and slidable in, said opening and a pressure member facing the end of the friction block farthest from said disc.

3. The disc brake assembly of claim 1 in which said means for forcing each friction member into frictional engagement with the adjacent braking surface of the disc comprises a fluid operated means on each side of the disc acting on the respective friction member.

4. The disc brake assembly of claim 3 in which the fluid operated means comprises a cylinder and piston assembly having an element thereof fixed on its respective limb and a movable element bearing against the outer end of said friction member.

5. The disc brake assembly of claim 4 in which the cylinder of each said cylinder and piston assembly is coaxial with and integral with said opening and said piston is movable with said friction element.

6. The disc brake assembly of claim 5 in which the outer ends of said cylinders have removable end closures.

7. The disc brake assembly of claim 1 in which the clearance of the guide opening from the disc is only a minor part of the length of the friction member.

8. The disc brake assembly of claim 1 in which the means for forcing each friction member into frictional engagement with the adjacent braking surface of the disc comprises a lever fulcrumed on one of said limbs and acting on the friction member mounted therein to force said friction member inwardly against the disc, a link extending transversely of said housing to the opposite side thereof and a lever fulcrumed on said link and bearing against the friction member mounted on the opposite limb of said housing.

9. The disc brake assembly of claim 8 in which the first mentioned lever is fulcrumed at one end on one of said limbs, extends across the opening therein and is connected at its opposite end to one end of said link and in which the second mentioned lever is connected to the other end of the link and extends transversely of the outer end of the opening in the other limb of said housing.

10. The disc brake assembly of claim 1 comprising a wear indicator rod movable with each friction member and extending out of the end of its respective recess distant from the surface of the disc.

11. The disc brake assembly of claim 1 in which said openings are axially aligned.

12. A disc brake assembly comprising a disc engaging with a rotatable member to be braked and braking means extending circumferentially over only a minor portion of the braking surfaces of the disc and comprising a non-rotatable housing having limbs extending adjacent each braking surface of the disc and in fixed axial relation thereto, friction members, one on each side of said disc, each movable to bring its friction surface into frictional engagement with its side of said disc, each limb providing an anchoring element extending toward the disc in position to receive adjacent said disc the anchoring thrust of its friction member, said anchoring element having a clearance from the adjacent braking surface of the disc which remains constant throughout the wear-life of the friction member, and means for forcing each friction member into frictional engagement with the adjacent braking surface of the disc.

References Cited in the file of this patent

UNITED STATES PATENTS

| Number | Name | Date |
|---|---|---|
| 2,319,231 | Hawley | May 18, 1943 |
| 2,392,970 | Bricker | Jan. 15, 1946 |
| 2,466,990 | Johnson et al. | Apr. 12, 1949 |
| 2,503,755 | Martin et al. | Apr. 11, 1950 |
| 2,548,008 | Franklin | Apr. 10, 1951 |
| 2,614,662 | Hawley | Oct. 21, 1952 |
| 2,655,227 | Eksergian | Oct. 13, 1953 |
| 2,657,772 | Chamberlain | Nov. 3, 1953 |